US012633866B2

(12) United States Patent
Hahn et al.

(10) Patent No.: US 12,633,866 B2
(45) Date of Patent: May 19, 2026

(54) APPARATUS AND METHOD FOR DETERMINING A TEMPERATURE OF A ROTOR

(71) Applicant: Robert Bosch GmbH, Stuttgart (DE)

(72) Inventors: Christian Hahn, Nuremberg (DE); Lei Chen, Stuttgart (DE); Michele Hirsch, Esslingen (DE); Sebastian Ziesche, Leonberg (DE); Wael Hilali, Stuttgart (DE); Michael Bangerter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 18/252,703

(22) PCT Filed: Oct. 5, 2021

(86) PCT No.: PCT/EP2021/077429
§ 371 (c)(1),
(2) Date: May 11, 2023

(87) PCT Pub. No.: WO2022/100932
PCT Pub. Date: May 19, 2022

(65) Prior Publication Data
US 2024/0014766 A1      Jan. 11, 2024

(30) Foreign Application Priority Data

Nov. 12, 2020    (DE) ..................... 10 2020 214 228.9

(51) Int. Cl.
*H02P 29/66*     (2016.01)
*H02P 23/00*     (2016.01)
(52) U.S. Cl.
CPC .......... *H02P 29/66* (2016.02); *H02P 23/0022* (2013.01)

(58) Field of Classification Search
None
See application file for complete search history.

(56) References Cited

U.S. PATENT DOCUMENTS

2011/0181217 A1*  7/2011  Vollmer ................ H02P 29/662
                                                        318/400.21

FOREIGN PATENT DOCUMENTS

EP            2318818 B1      9/2016

OTHER PUBLICATIONS

Emebet Gebeyehu Gedlu , Oliver Wallscheid , Joachim Böcker . Permanent Magnet Synchronous Machine Temperature Estimation using Low-Order Lumped-Parameter Thermal Network with Extended Iron Loss Model. TechRxiv. Jan. 21, 2020. DOI: 10.36227/techrxiv. 11671401.v1 (Year: 2020).*

(Continued)

*Primary Examiner* — Matthew G Marini
(74) *Attorney, Agent, or Firm* — Michael Best & Friedrich LLP

(57) ABSTRACT

The invention relates to an apparatus for determining a temperature of a rotor of an electric machine. The apparatus comprises an interface and a computing device. Input variables which are dependent on the operation of the electric machine are received via the interface. The computing device calculates, by means of a physical model, a first contribution to the heat transfer on the rotor on the basis of at least one of the input variables. In addition, the computing device calculates, by means of an artificial intelligence model, a second contribution to the heat transfer on the rotor on the basis of at least one of the input variables. The computing device calculates the temperature of the rotor on the basis of the first contribution and the second contribution to the heat transfer on the rotor.

6 Claims, 4 Drawing Sheets

(56)          References Cited

OTHER PUBLICATIONS

Translation of International Search Report for Application No. PCT/EP2021/077429 dated Jan. 4, 2022 (2 pages).

Gedlu et al., "Permanent Magnet Synchronous Machine Temperature Estimation using Low-Order Lumped-Parameter Thermal Network with Extended Iron Loss Model," an extension of a full paper submitted to the 10th International Conference on Power Electronics, Machines and Drives (PEMD) 2020, 9 pages.

Wallscheid et al., "Fusion of Direct and Indirect Temperature Estimation Techniques for Permanent Magnet Synchronous Motors," IEEE International Electric Machines and Drives Conference (IEMDC), 2017, 8 pages.

Chen et al., "A Comprehensive Thermal Model for System-Level Electric Drivetrain Simulation with Respect to Heat Exchange Between Components," 19th IEEE Intersociety Conference on Thermal and Thermomechanical Phenomena in Electronic Systems (ITherm), 2020, 11 pages.

* cited by examiner

APPARATUS AND METHOD FOR DETERMINING A TEMPERATURE OF A ROTOR

BACKGROUND

The present invention relates to an apparatus for determining a temperature of a rotor of an electric machine. The invention also relates to a method for determining a temperature of a rotor of an electric machine.

The invention in particular relates to electric machines used in hybrid vehicles, electric vehicles or fuel cell vehicles.

For electric machines in the automotive sector, the determination of the rotor temperature is of particular importance to avoid demagnetization of the rotor magnets in the event of overheating and also the consequences thereof, such as premature derating. Measuring the rotor temperature using temperature sensors is difficult, however. Therefore, the rotor temperature of the electric machine is usually determined by means of physical modeling. One example of a method for ascertaining a rotor temperature of a synchronous machine is known from EP 2 318 818 B1.

Due to the limited memory and computing capacity on control units, simple 1-node thermodynamic models are used for onboard applications. However, these thermal models typically cannot identify all thermal sources. The modeled heat loss terms have to be determined or calibrated with very complex simulation and/or test bench measurements.

SUMMARY

The invention provides an apparatus for determining a temperature of a rotor of an electric machine and a computer-implemented method for determining a temperature of a rotor of an electric machine.

According to a first aspect, the invention therefore relates to an apparatus for determining a temperature of a rotor of an electric machine. The apparatus comprises an interface and a computing device. Input variables which are dependent on the operation of the electric machine are received via the interface. The computing device uses at least one of the input variables to calculate a first contribution to the heat transfer on the rotor by means of a physical model. The computing device further uses at least one of the input variables to calculate a second contribution to the heat transfer on the rotor by means of an artificial intelligence model. The computing device uses the first contribution and the second contribution to the heat transfer on the rotor to calculate the temperature of the rotor.

According to a second aspect, the invention relates to a computer-implemented method for determining a temperature of a rotor of an electric machine. Input variables which are dependent on the operation of the electric machine are provided to a computing device. The computing device uses at least one of the input variables to calculate a first contribution to the heat transfer on the rotor by means of a physical model. The computing device further uses at least one of the input variables to calculate a second contribution to the heat transfer on the rotor by means of an artificial intelligence model. The computing device uses the first contribution and the second contribution to the heat transfer on the rotor to calculate the temperature of the rotor.

According to further aspects, the invention relates to a computer program product and a non-volatile computer-readable storage medium comprising program code for carrying out the computer-implemented method.

The invention relates to calculating the temperature of the rotor using a hybrid model (overall model), which includes a physical model and an artificial intelligence model. The estimation of the temperature of the rotor thus becomes more accurate than would be possible purely on the basis of a physical model.

The use of the hybrid model is based on the consideration that some contributions to the heat transfer on the rotor are easy to model and can therefore be described by a physical model. However, there are also heat losses that are difficult to depict in their entirety by physical models. To date, the known heat loss terms have either not been at all calculated at all or only using a so-called power loss map (lookup table) and an interpolation method (e.g. via Gaussian processes). Due to the high-dimensional input, this implementation is very resource-intensive. The values of the power loss map are calculated or calibrated using complex simulations and test bench measurements, but not all of the heat loss terms are covered. Calibration with only one sample moreover results in effects due to variance in production are not depicted.

By using the hybrid model, the heat losses are preferably no longer calculated using simulations, but are measured using data on the test bench.

A table is also preferably no longer used as a basis; instead an artificial intelligence model is trained with the test bench data, the output of which is directly the effective heat loss. This in particular takes into account heat losses resulting from extraneous sources, which increases the accuracy of the overall model and reduces the computational effort of the control unit.

The invention is intended to enable the most accurate possible machine-specific estimation of the temperature of the rotor of an electric machine during operation. Demagnetization and derating during operation can thus be prevented. The consumption of resources for the calculation on the control unit can be reduced as well.

According to a preferred embodiment of the apparatus for determining the temperature of the rotor of the electric machine, the first contribution to the heat transfer on the rotor includes a heat flow from a stator of the electric machine to the rotor. The heat flow from the stator to the rotor is easy to model by a physical model.

According to a preferred embodiment of the apparatus for determining the temperature of the rotor of the electric machine, the first contribution to the heat transfer on the rotor includes a heat flow from a coolant of the electric machine to the rotor. The heat flow from the coolant to the rotor is likewise easy to model by a physical model.

According to a preferred embodiment of the apparatus for determining the temperature of the rotor of the electric machine, the artificial intelligence model includes an artificial neural network.

According to a preferred embodiment of the apparatus for determining the temperature of the rotor of the electric machine, the at least one input variable includes a current temperature of the stator and/or a current temperature of the coolant. The computing device calculates the first contribution to the heat transfer on the rotor using a temperature difference between the current temperature of the stator and the most recently calculated temperature of the rotor and/or using a temperature difference between the current temperature of the coolant and the most recently calculated temperature of the rotor.

According to a preferred embodiment of the apparatus for determining the temperature of the rotor of the electric machine, the input variables include at least one current of the electric machine, at least one voltage of the electric machine, a DC link voltage of a battery coupled to the electric machine, an effective phase current of the electric machine, a pulse width modulation frequency, a rotational speed of the electric machine, a torque of the electric machine, at least one modulation variable of the electric machine, an ambient temperature of the electric machine and/or a transmission temperature of a transmission coupled to the electric machine.

Training the artificial intelligence model taking into account an ambient temperature of the electric machine and a transmission temperature of a transmission coupled to the electric machine gives the artificial intelligence model a major advantage over purely physical modeling, because the heat paths to the environment and the surrounding components in the e-axle (and generally in the vehicle) cannot easily be physically described and modeled. With the hybrid model, however, all thermal sources, i.e. also extraneous sources such as those on the transmission, can be projected into the rotor losses, which enables a more accurate determination of the rotor temperature under real conditions.

To take this environmental influence into account, telemetry measurements for training the artificial intelligence model are preferably carried out with the entire installation; i.e. temperature measurements from the rotor as part of the complete e-axle or on-board measurements in vehicles equipped with a rotor temperature sensor. On-board measurements enable realistic modeling of the heat paths and losses in the electric machine because they reflect the real conditions and take into account the aging and series variation effects. This is another advantage of the hybrid approach over purely physical modeling.

It is not only advantageous that the simulation and calibration effort is reduced and that thermal sources that are not easy to model are taken into account. The artificial intelligence model can furthermore also be trained with the influencing variables from series production in order to calculate the induced heat losses more accurately and in a machine-specific manner.

According to a preferred embodiment of the apparatus for determining the temperature of the rotor of the electric machine, the computing device checks the plausibility of the input variables (for example the temperature of the stator or the coolant) and/or the first contribution to the heat transfer on the rotor and/or the second contribution to the heat transfer on the rotor. This increases the robustness of the calculation of the temperature of the rotor.

According to a preferred embodiment of the apparatus for determining the temperature of the rotor of the electric machine, the computing device checks the plausibility using at least one physical formula. A limit value (threshold value) for the heat loss, for example, can be calculated using the physical formula or the physical formulas. If the calculated second contribution to heat transfer is outside the limit value determined using the physical formula, the limit value can be used instead.

According to a preferred embodiment of the apparatus for determining the temperature of the rotor of the electric machine, the computing device checks the plausibility using an artificial intelligence method. This makes it possible to detect anomalies in the input signals.

According to a preferred embodiment of the apparatus for determining the temperature of the rotor of the electric machine, the computing device checks the plausibility using sensor signals received from sensors installed in the electric machine. If necessary, the models can be readjusted. Such a readjustment can be necessary as a result of the series variation and additional heat paths in the installation, for instance.

The electric machine can drive any system, but in particular battery-electrically or hydrogen-powered motor vehicles.

According to another embodiment, the apparatus for determining the temperature of the rotor of the electric machine is connected to a cloud. If the AI model is trained with the machine-specific production data (such as an air gap or a sheet thickness), the hybrid model, when connected to the cloud (and with the data from the digital twin), can provide a very accurate temperature estimate which can show the effects caused by variance in production, aging effects or even the ambient conditions.

According to another embodiment, the apparatus for determining the temperature of the rotor comprises machine learning modules for analyzing, plausibility checking and processing large amounts of data. The input variables received via the interface can, for instance, include operating conditions of the electric machine, an ambient temperature or other weather data.

The calculation of the rotor temperature can also be carried out in the cloud. It is in particular possible to create a digital twin for the electric machine, wherein the calculation of the rotor temperature is carried out as part of the digital twin. This also makes it possible to carry out a plausibility check of the on-board model.

In all figures, identical or functionally identical elements and devices are provided with the same reference sign. The numbering of method steps is for the sake of clarity and is generally not intended to imply a specific chronological order. It is in particular also possible to carry out multiple method steps at the same time.

DETAILED DESCRIPTION

Figure 1:
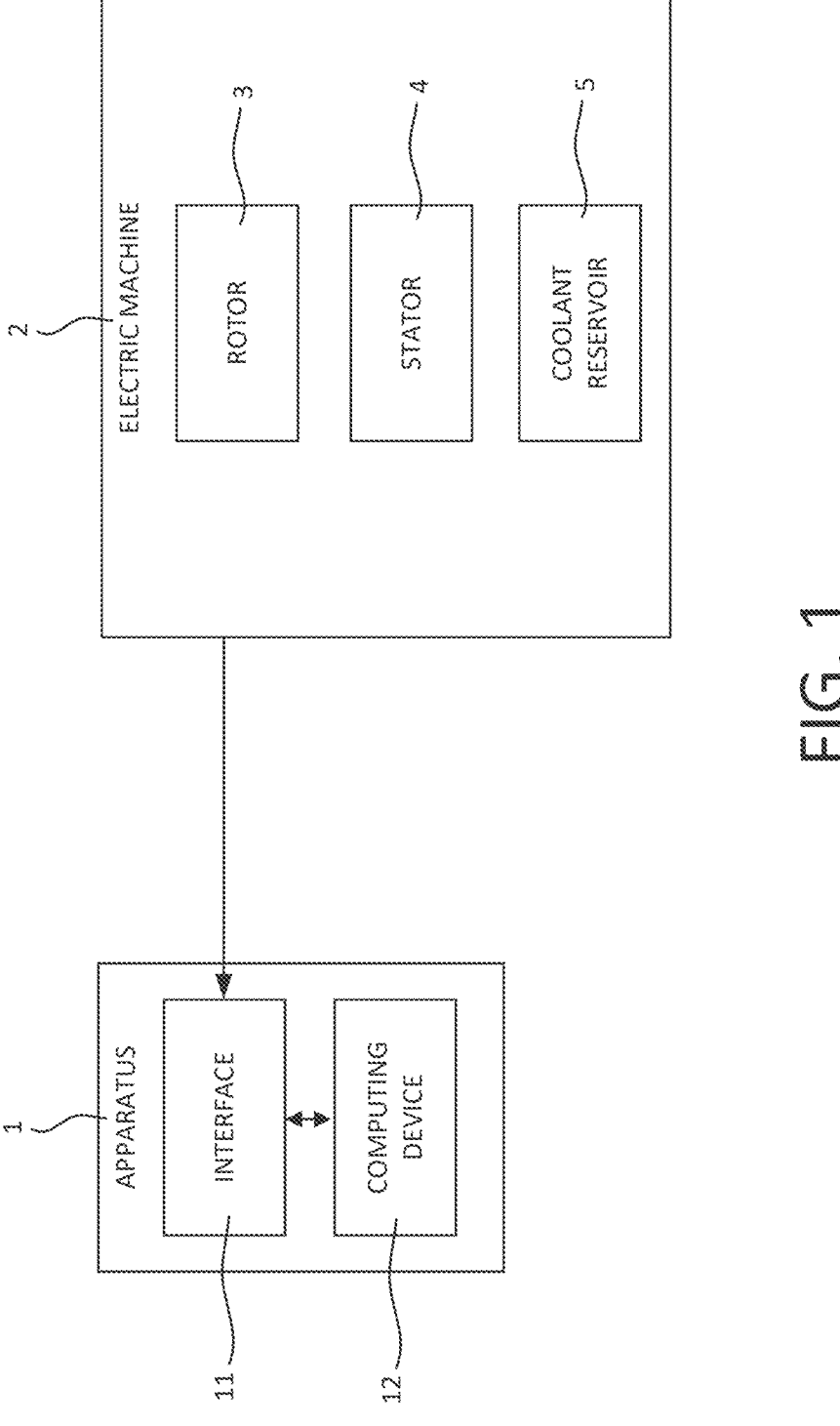
FIG. 1 a schematic block diagram of an electric machine and an apparatus for determining a temperature of a rotor of the electric machine according to one embodiment of the invention.

FIG. 1 shows a schematic block diagram of an electric machine 2 and an apparatus 1 for determining a temperature of a rotor 3 of the electric machine 2. The electric machine 2 further comprises a stator 4 and a coolant reservoir 5.

The apparatus comprises an interface 11 and a computing device 12. The interface 11 is preferably wired, but can also be a wireless interface. The computing device 12 comprises memories for storing the received data and computing components, such as microprocessors, application-specified circuits (ASICs) or the like.

Input variables which are dependent on the operation of the electric machine are received via the interface 11. The input variables include physical or mechanical variables (e.g. temperatures, a torque, a rotational speed and the like) and/or electrical variables (e.g. currents and the like).

The computing device 12 uses at least one of the input variables (such as the temperature of the stator 4 and the temperature of the coolant 5) to calculate a first contribution to the heat transfer on the rotor 3 by means of a physical model. The computing device 12 further uses at least one of the input variables (such as currents and a torque) to at the same time or subsequently calculate a second contribution to the heat transfer on the rotor 3 by means of an artificial intelligence model. The same or at least partially different input variables can be taken into account for this purpose. The artificial intelligence model can include a neural network or a Gaussian process regressor. The computing device uses the first contribution and the second contribution to the heat transfer on the rotor to calculate the temperature of the rotor 3.

The calculated temperature can be output via the interface 11. A control unit can receive the calculated temperature of the rotor 3, for example, and use it to control the electric machine.

Figure 2:
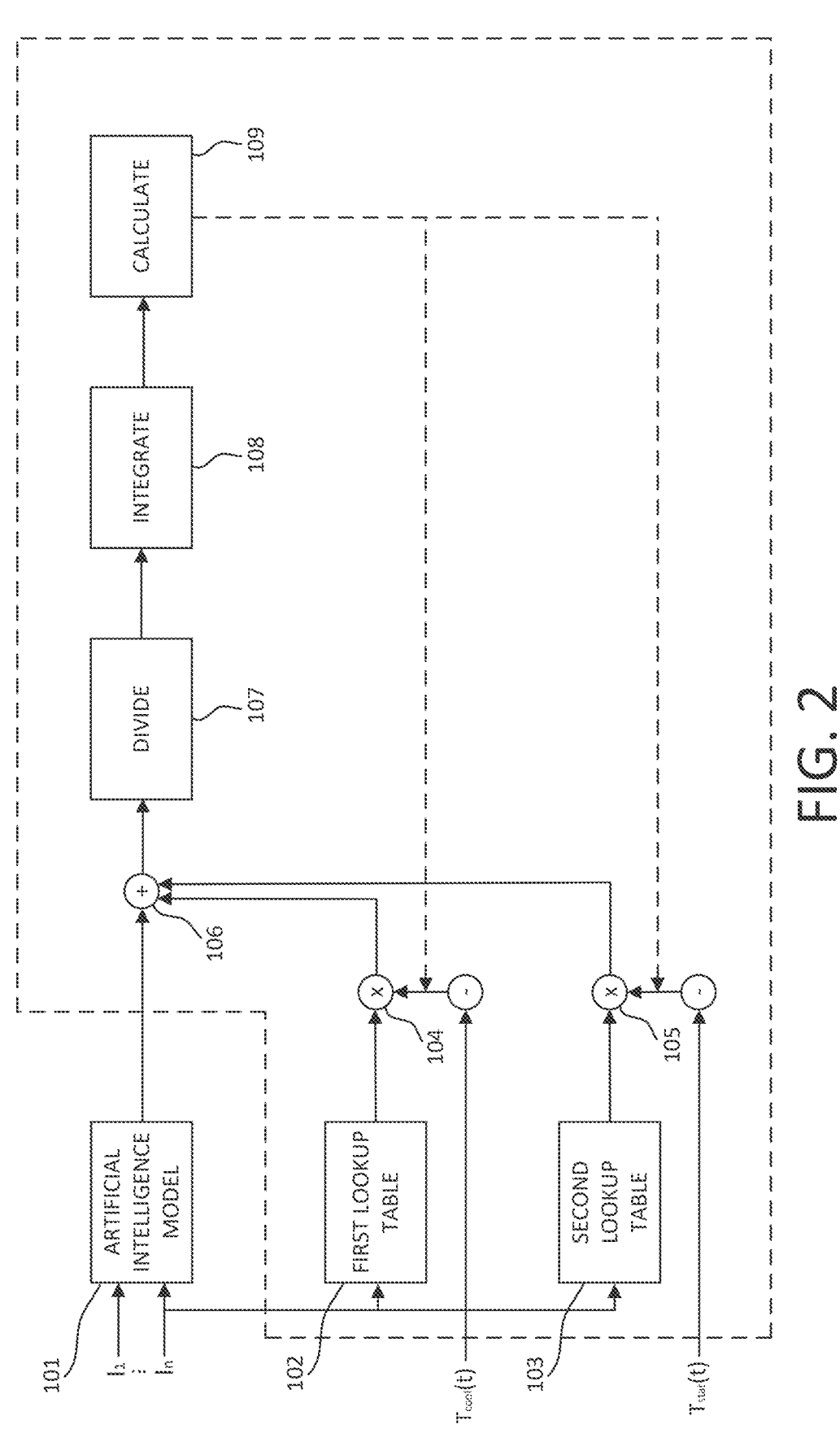
FIG. 2 a schematic block diagram explaining the calculation of the temperature of the rotor of the electric machine.

FIG. 2 shows a schematic block diagram explaining the calculation of the temperature of the rotor 3 of the electric machine 2 by means of a hybrid thermal model. This is a 1-node network model.

The temperature $T_{cool}(t)$ of the coolant 5 and the temperature $T_{start}(t)$ on the stator 4 are received as an input variable. Input variables $I_1, \ldots I_n$ of the artificial intelligence model 101 are furthermore provided, which include currents of the electric machine 2, voltages of the electric machine 2, a DC link voltage of a battery coupled to the electric machine 2, an effective phase current of the electric machine 2, a pulse width modulation frequency, a rotational speed of the electric machine 2, a torque of the electric machine 2, modulation variables of the electric machine 2, an ambient temperature of the electric machine 2 and/or a transmission temperature of a transmission coupled to the electric machine 2.

A difference between the current temperature of the coolant 5 and the most recently calculated temperature of the rotor 3 is calculated by the computing device 12:

$$T_{cool}(t)-T_{rot}(t-1).$$

The computing device 12 also calculates a difference between the current temperature of the stator 4 and the most recently calculated temperature of the rotor 3:

$$T_{start}(t)-T_{rot}(t-1).$$

A heat flow from the coolant 5 to the rotor 3 is calculated by multiplying (104) by a specific thermal conductivity of the coolant 5 stored in a first lookup table 102. A heat flow from the stator 4 to the rotor 3 is calculated as well, by multiplying (105) by a specific thermal conductivity of the stator 4 stored in a second lookup table 103. The two calculated heat flows constitute a first contribution to the, in particular convective, heat transfer on the rotor 3.

The artificial Intelligence Model 101 calculates a second contribution to the heat transfer on the rotor 3 using the input variables $I_1, \ldots I_n$. The first contribution to the heat transfer on the rotor 3 is added (106) to the second contribution to the heat transfer on the rotor 3. The heat losses within the rotor 3 in particular constitute a second contribution to the heat transfer on the rotor 3.

The computing device 12 divides (107) the summed contributions to the heat transfer on the rotor 3 by the specific heat capacity $C_{th,rot}$ of the rotor 3, wherein the specific heat capacity $C_{th,rot}$ of the rotor 3 is the ratio of the added or removed heat and the resulting change in the temperature:

$$C_{th,rot} = \frac{dQ}{dT}$$

This variable is integrated (108) over time in order to calculate (109) the instantaneous temperature of the rotor 3.

The calculation of the first contribution and the calculation of the second contribution can preferably be carried out in parallel.

Figure 3:
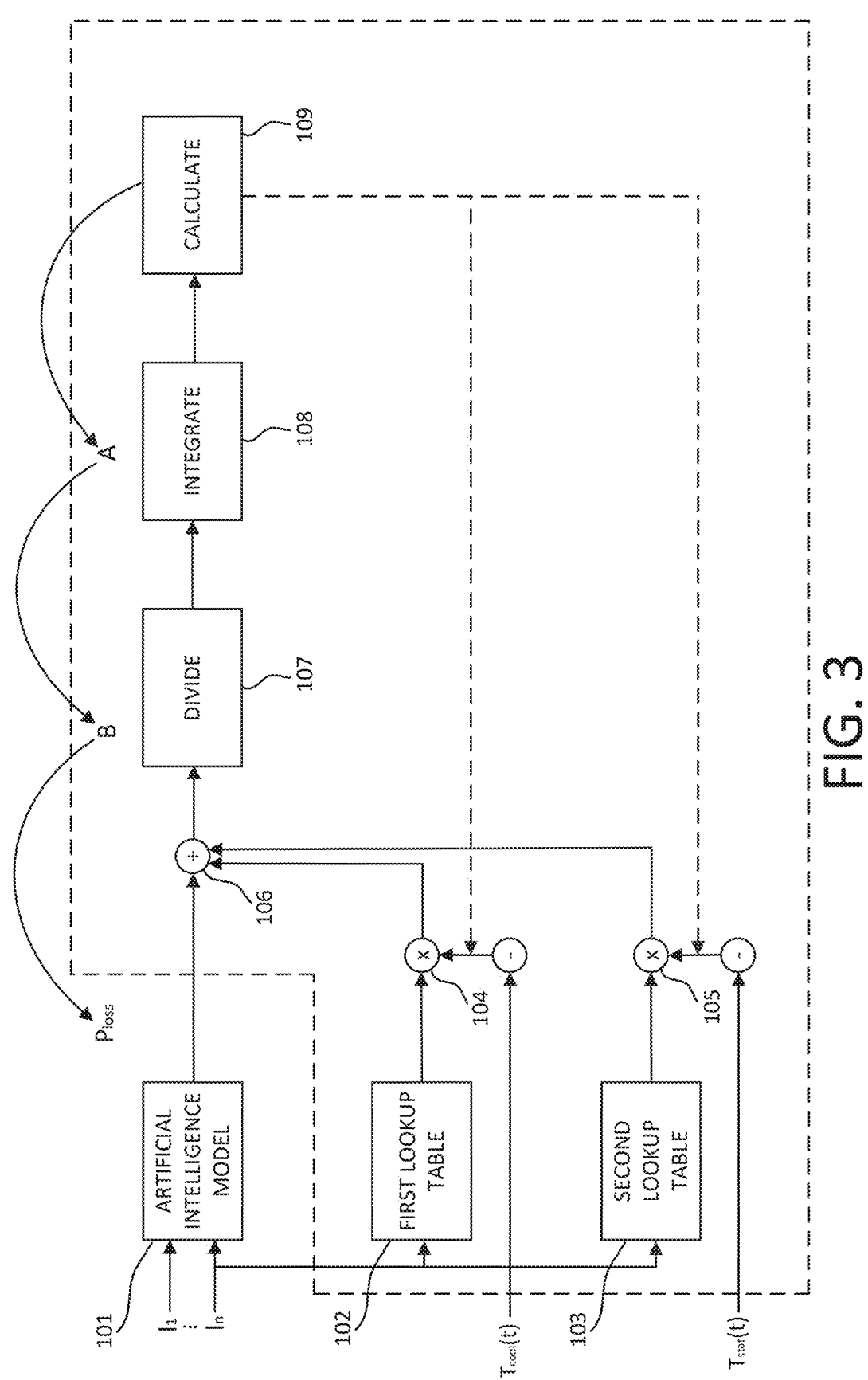
FIG. 3 a schematic block diagram explaining a training method of the artificial intelligence model.

FIG. 3 shows a schematic block diagram explaining a training method of the artificial intelligence model 101. Separation into a static component (steady-state loss map) and a dynamic component facilitates the training of the artificial intelligence model 101 and reduces its size. A separate artificial intelligence model is preferably trained for each type of electric machine 2. In the application phase, the artificial intelligence model 101 is trained with test bench measurements in order to calculate features (labels). The test bench measurements can be telemetry measurements of the temperature of the rotor 3 under different load and ambient conditions.

To train the artificial intelligence model 101, the required label is determined backward from the telemetry measurements of the temperature of the rotor 3 (109). For this purpose, a time integration is carried out to calculate a difference between the current temperature of the rotor 3 and the previous temperature of the rotor 3 (A):

$$\Delta T = T_{rot}(t)-T_{rot}(t-1).$$

This is followed by a multiplication with the specific heat capacity $C_{th,rot}$ of the rotor 3 (B):

$$C_{th,rot} \cdot \Delta T.$$

Lastly, the heat loss $P_{loss}$ on the rotor is calculated as the label by subtracting the first contribution. This label is used to train the artificial intelligence model 101. The trained artificial intelligence model 101 for the heat loss modeling is then used forward as a building block throughout the hybrid model for calculating the rotor temperature.

The robustness of the artificial intelligence model 101 can optionally be ensured by training with artificially noisy data. The data sets are enriched by systematically adding noise to the training signals. This method ensures the robustness and a certain degree of noise tolerance of the artificial intelligence model 101.

It is also possible to use plausibility check functions to check the input variables (e.g. the temperature of the stator 4 or the coolant 5) for (sensor) errors. This plausibility check can be carried out with at least one physical formula, which is used to check whether the input values are within a physically valid range. The plausibility check can also be carried out using machine learning methods that can detect anomalies.

In the event of a sensor failure or error detection, the artificial intelligence model 101 will reference the last plausible value of the affected input signal and provide a worst case prediction of the temperature of the rotor 3 to ensure component protection.

Figure 4:
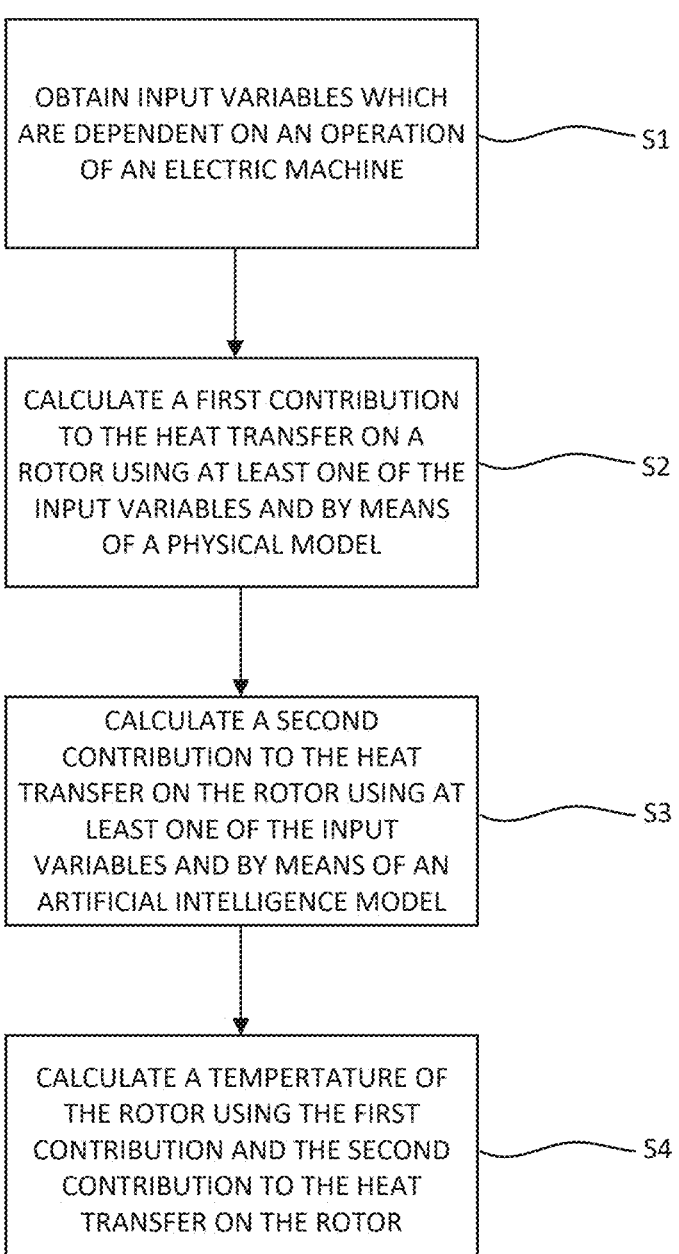
FIG. 4 a flow chart of a method for determining a temperature of a rotor of an electric machine according to one embodiment of the invention.

FIG. 4 shows a flow chart of a method for determining a temperature of a rotor 3 of an electric machine 2.

In a first step S1, input variables which are dependent on the operation of the electric machine 2 are received. The input variables are provided to a computing device 12.

In a second step S2, the computing device 12 uses at least one of the input variables to calculate a first contribution to the heat transfer on the rotor 3 by means of a physical model. The computing device 12 can in particular take into account a heat flow from a stator 4 of the electric machine 2 to the rotor 3 and a heat flow from a coolant 5 of the electric machine 2 to the rotor 3 to calculate the first contribution to the heat transfer on the rotor 3.

In a third step S3, the computing device 12 uses at least one of the input variables to calculate a second contribution to the heat transfer on the rotor 3 by means of an artificial intelligence model 101. For this purpose, the artificial intelligence model 101 can have been trained in a preceding training procedure using telemetry data, as explained in more detail in connection with FIG. 3.

In a fourth step S4, the computing device 11 lastly uses the first contribution and the second contribution to the heat transfer on the rotor 3 to calculate the temperature of the rotor 3. For this purpose, the specific heat capacity $C_{th,rot}$ of the rotor 3 can be taken into account as described above.

The calculated temperature of the rotor 3 is output and taken into account, for example, by a control unit when controlling the electric machine 3. The determined temperature of the rotor 3 can in particular be taken into account in a derating method.

The invention claimed is:

1. An apparatus (1) for determining a temperature of a rotor (3) of an electric machine (2), the apparatus comprising:

an interface (11) configured to receive input variables which are dependent on the operation of the electric machine (2); and a computing device (12) which is configured to:

use at least one of the input variables to calculate a first contribution to the heat transfer on the rotor (3) by means of a physical model, wherein the at least one input variable includes a current temperature of the stator (4) and/or a current temperature of the coolant (5), and wherein the computing device (12) is configured to calculate the first contribution to the heat transfer on the rotor (3) using a temperature difference between the current temperature of the stator (4) and the most recently calculated temperature of the rotor (3) and/or using a temperature difference between the current temperature of the coolant (5) and the most recently calculated temperature of the rotor (3), wherein the first contribution to the heat transfer on the rotor (3) includes a heat flow from a stator (4) of the electric machine (2) to the rotor (3) and/or a heat flow from a coolant (5) of the electric machine (2) to the rotor (3), use at least one of the input variables to calculate a second contribution to the heat transfer on the rotor (3) by means of an artificial intelligence model (101), wherein the artificial intelligence model is trained with test bench measurements to retrospectively group the test bench measurements into distinct labels, wherein the test bench measurements are telemetry measurements of the temperature of the rotor (3) under different load and ambient conditions, wherein the labels are determined based on a difference between the current temperature of the rotor (3) and the previous temperature of the rotor (3), use the first contribution and the second contribution to the heat transfer on the rotor (3) to calculate the temperature of the rotor (3); and derate the electric machine, based on the calculated temperature of the rotor, to reduce demagnetization of rotor magnets.

2. The apparatus (1) according to claim 1, wherein the input variables include at least one current of the electric machine (2), at least one voltage of the electric machine, a DC link voltage of a battery coupled to the electric machine (2), an effective phase current of the electric machine (2), a pulse width modulation frequency, a rotational speed of the electric machine (2), a torque of the electric machine (2), at least one modulation variable of the electric machine (2), an ambient temperature of the electric machine (2) and/or a transmission temperature of a transmission coupled to the electric machine (2).

3. The apparatus (1) according to claim 1, wherein the computing device (12) is further configured to check the plausibility of the input variables and/or the first contribution to the heat transfer on the rotor (3) and/or the second contribution to the heat transfer on the rotor (3).

4. The apparatus (1) according to claim 3, wherein the computing device (12) is configured to check the plausibility using at least one physical formula and/or an artificial intelligence method.

5. A computer-implemented method for determining a temperature of a rotor (3) of an electric machine (2), comprising:

providing (S1) input variables which are dependent on the operation of the electric machine (2);

calculating (S2) a first contribution to the heat transfer on the rotor (3) using at least one of the input variables and by means of a physical model, wherein the at least one input variable includes a current temperature of the stator (4) and/or a current temperature of the coolant (5), and wherein the computing device (12) is configured to calculate the first contribution to the heat transfer on the rotor (3) using a temperature difference between the current temperature of the stator (4) and the most recently calculated temperature of the rotor (3) and/or using a temperature difference between the current temperature of the coolant (5) and the most recently calculated temperature of the rotor (3), wherein the first contribution to the heat transfer on the rotor (3) includes a heat flow from a stator (4) of the electric machine (2) to the rotor (3) and/or a heat flow from a coolant (5) of the electric machine (2) to the rotor (3);

calculating (S3) a second contribution to the heat transfer on the rotor (3) using at least one of the input variables and by means of an artificial intelligence model (101), wherein the artificial intelligence model is trained with test bench measurements to retrospectively group the test bench measurements into distinct labels, wherein the test bench measurements are telemetry measurements of the temperature of the rotor (3) under different load and ambient conditions, wherein the labels are determined based on a difference between the current temperature of the rotor (3) and the previous temperature of the rotor (3);

calculating (S4) the temperature of the rotor (3) using the first contribution and the second contribution to the heat transfer on the rotor (3); and derating the electric machine, based on the calculated temperature of the rotor, to reduce demagnetization of rotor magnets.

6. A non-transitory, computer-readable storage medium comprising executable instructions that when executed by a computer cause the computer to determine a temperature of a rotor (3) of an electric machine (2), by:

obtaining (S1) input variables which are dependent on the operation of the electric machine (2);

calculating (S2) a first contribution to the heat transfer on the rotor (3) using at least one of the input variables and by means of a physical model, wherein the at least one input variable includes a current temperature of the stator (4) and/or a current temperature of the coolant (5), and wherein the computing device (12) is configured to calculate the first contribution to the heat transfer on the rotor (3) using a temperature difference between the current temperature of the stator (4) and the most recently calculated temperature of the rotor (3) and/or using a temperature difference between the current temperature of the coolant (5) and the most recently calculated temperature of the rotor (3), wherein the first contribution to the heat transfer on the rotor (3) includes a heat flow from a stator (4) of the electric machine (2) to the rotor (3) and/or a heat flow from a coolant (5) of the electric machine (2) to the rotor (3);

calculating (S3) a second contribution to the heat transfer on the rotor (3) using at least one of the input variables and by means of an artificial intelligence model (101), wherein the artificial intelligence model is trained with test bench measurements to retrospectively group the test bench measurements into distinct labels, wherein the test bench measurements are telemetry measurements of the temperature of the rotor (3) under different load and ambient conditions, wherein the labels are determined based on a difference between the current temperature of the rotor (3) and the previous temperature of the rotor (3);

calculating (S4) the temperature of the rotor (3) using the first contribution and the second contribution to the heat transfer on the rotor (3); and derating the electric machine, based on the calculated temperature of the rotor, to reduce demagnetization of rotor magnets.

\* \* \* \* \*